Figure 1:
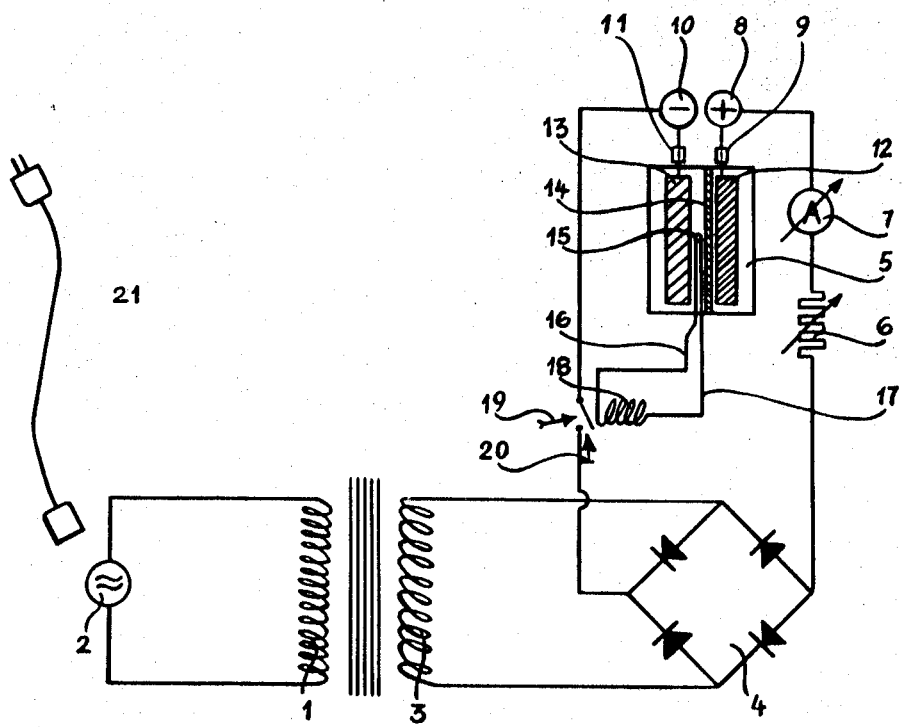

United States Patent

[11] 3,601,679

| [72] | Inventors | Artur Braun<br>6 Russelsheimerstrasse 22,,<br>Frankfur tam main;<br>Heinz Luchterhand, 6239 Fucksweg 7,,<br>Diedenbergen, both of, Germany |
|---|---|---|
| [21] | Appl. No. | 888,122 |
| [22] | Filed | Dec. 30, 1969 |
| [45] | Patented | Aug. 24, 1971<br>Continuation of application Ser. No.<br>634,378, Apr. 27, 1967, now abandoned. |

[54] SOURCE OF ELECTRICAL ENERGY
2 Claims, 2 Drawing Figs.

[52] U.S. Cl. .......................................... 320/35,
317/54, 320/54, 335/143
[51] Int. Cl. ...................................... H02j 7/04
[50] Field of Search............................ 335/167,
170, 177, 143; 337/140; 317/54; 320/39, 40, 54,
35, 36, DIG. 2

[56] References Cited
UNITED STATES PATENTS

| 3,033,909 | 5/1962 | Urry | 136/59 |
| 2,807,755 | 9/1957 | Thayer et al. | 317/54 |
| 2,955,245 | 10/1960 | Payne et al. | 320/35 |

FOREIGN PATENTS

| 679,267 | 4/1966 | Belgium | |

Primary Examiner—J. D. Miller
Assistant Examiner—John M. Gunther
Attorney—David R. Murphy ABSTRACT: A compact portable source of electrical energy for electric razors comprising:
A. at least one electric cell having a gastight enclosure, which is rapidly chargeable at high amperages and safe from overcharging,
B. a charging device adapted to receive power from an external source and adjusted to deliver a high amperage charging current to the cell, preferably by means of a thyristor circuit, and
C. a temperature sensor in thermal proximity with said cell adapted to produce a signal when the temperature of the cell reaches a predetermined level, thereby indicating the degree of charge of the cell. The power sources of the present invention are especially useful to supply electrical energy to electric razors.

SOURCE OF ELECTRICAL ENERGY

CROSS-REFERENCE TO RELATED APPLICATIONS

This application is a continuation of U.S. application Ser. No. 634,378 filed Apr. 27, 1967, and now abandoned.

DISCLOSURE

This invention relates to power sources and in particular to power sources having rechargeable batteries and devices which limit or terminate the charging of these batteries. This invention is particularly applicable to power sources for use with electric razors.

Electric storage batteries are used frequently as convenient power sources for such applications in which a small amount of power is required. A typical example of such an application is the razor powered by an electric battery and connected with it into one unit.

The use of such batteries in this and in similar areas is tied to various suppositions: 1. the batteries must operate as long as possible without maintenance; 2. the batteries must not cause corrosion of the devices in which they are employed, for example, through output of electrolytes; and 3. the batteries must have a size and shape which facilitates their insertion into the devices without altering the designed shape and dimension of the unit.

Well-known in the art are batteries which are built into gastight enclosures. Such batteries have the disadvantage that they not only require very extended charging times, sometimes averaging 14 hours, but also that the charging process cannot be followed by simple means, with the result that the end of the charging, when the battery becomes fully charged, cannot be recognized.

The more recent development in the field of storage batteries has led to batteries which can be charged at high amperages and therefore require only short charging times. such a battery type, which is constructed approximately in accordance with Belgian Patent 679,267, is characterized by the fact that the electrolyte is dried to such an extent that the inside pressure will not surpass a conveniently low pressure limit during any length of overcharging at commonly employed charging amperages.

Such batteries chargeable with high amperages are, as previously mentioned, chargeable with high amperages and can even be overcharged for a considerable time without being damaged; however, in order not to use energy unnecessarily and in order not to decrease the service life of the battery unnecessarily, it is desirable to limit the charging process to the desired degree with simple means and automatically terminate the charging process when the batteries are fully charged.

The electric energy required for the recharging of batteries is usually taken from the electric supply mains such as household outlets delivering an alternating current of 110 or 220 volts. This alternating current is usually converted with the help of a transformer and a rectifier, which have been united in a known manner, into a charging device together with other circuit elements into a direct current voltage of suitable amperage for charging an accumulator or a storage battery. The amperage to be used for charging can generally be varied by any known means such as by the use of a potentiometer.

In order to be able to terminate the charging process at the desired time, measuring devices are used which will indicate the achieving of the full charging state of the battery, and/or will automatically interrupt the charging circuit. It has been known, for example, to use the thermal voltage of a battery for the recording of its charging state. A density measurement of the electrolyte can also be used as a criterion for the determination of the charging state. As reliable as both methods are in their application to lead batteries, still they are unsuitable in the case of batteries which do not significantly change their pertinent characteristics. For example, the thermal voltage in the case of alkaline batteries such as those employing Ni-Cd, Ag-Cd or Ag-Zn electrodes, changes considerably less after reaching the full charging state than in the case of lead batteries. The density of the electrolyte in alkaline batteries is independent of its state of charge and remains approximately constant.

In batteries having a gastight enclosure, with which the present invention deals, it is impossible to observe the violent gas development which begins after the full charging state has been reached. Accordingly, the development of gas cannot be used as an indicator of the fully charged state of the battery and cannot be used as a signal to automatically open the charging circuit. Measurement of the state of charge of the battery by means of an auxiliary electrode is not only very expensive but it is also quite inconvenient.

In order to make possible an accelerated charging and a reliable completion of the charging process, the invention returns to the realization that is already familiar in which the known and proposed types of batteries will heat up only slightly until they reach their fully charged condition, but will heat up relatively strongly at the continuation of the charging process, that is to say during the so-called overcharging. As long as the active mass inside the accumulators is regenerated as a result of the passage of the current, the heat development will be little, even when using relatively high amperages such as those greater than 3 C, wherein C signifies the capacity of a cell in ampere hours. The reactions taking place during the overcharging, which are particularly characterized by the formation and consumption of hydrogen and oxygen, will, on the other hand, cause a strong heating of the batteries. Timely termination of the charging process is desirable in order to avoid unnecessary energy consumption as well as overheating of the battery and the attendant accelerated wear which is particularly prevalent when high amperage charging currents are employed. In the case of continuous overcharging with high amperages such as those of more than 5 C, it is possible to reach temperatures of more than 90° C. especially in batteries having a gastight enclosure, said temperatures leading to the destruction of the cells. The batteries useful in the present invention are preferably provided with a valve.

One or several cells having a gastight enclosure, arranged in the housing of an electric razor, have a capacity which lies within the order of magnitude of 0.1 to 2 ampere hours. Heretofore, these batteries could only be recharged at low amperages because overcharging, which causes the development of gas at the electrodes, creates high internal pressures which eventually causes destruction of the battery. Electric razors employing such batteries are available commercially in Germany and elsewhere, and are known to suffer from the above-described problems.

The amperages permissible for recharging of the batteries, therefore, lie in the hitherto relatively inoffensive area of C/20—C/6, stated in ampere, if C designates the capacity in ampere hours of a cell in a battery of cells connected in series. With these low amperages, long charging times, for example, of 14 hours, are required for the complete recharging of an entirely discharged battery.

The number of shaves which can be carried out before complete discharge of the battery depends on the efficiency of the low voltage motor which operates the shearing system. In the case of the known be low, razors, the efficiency of the driving motor can below, since there is always sufficient energy available. In the case of a battery-operated DC current motor, the efficiency must, however, be as great as possible and at least 35 percent, in order to increase the duration of use.

In the case of normal use of the razor, the batteries will ordinarily have to be recharged once a week; in the case of a more extended duration of a shave, even more frequently. The batteries closed in a gastight manner and used customarily have no possibility of recognizing the charging state of the battery. Consequently, it might happen that it will be impossible to get a shave or that the shave will have to be interrupted before it is finished, because the battery has been completely discharged. A waiting time of 14 hours for a complete recharging of the batteries or even of only about 2 hours in order to store only as much electrical power as is needed to complete an interrupted shave, is a great drawback.

The present invention employs batteries consisting of cells having a gastight enclosure in their housings and which, moreover have been arranged in such a manner that they can be charged with high amperages, and is based on the task to meet the above-described conditions for instruments operated by batteries by selecting a battery which is rechargeable with high amperages and which is even safe against overcharging and uses said battery for an electric razor with low power consumption and which, through simultaneous adaptation of the charging device creates the possibility that the electric razor will again be fully charged in less than 2 hours and preferably in about 30 minutes even if the battery has been completely discharged, or that it will have sufficient charge within 3 to 10 minutes in order to complete the shave without interruption.

According to the present invention, the above and other objects are accomplished through a combination of the following characteristics:

a. the battery is of such a type which is quickly rechargeable with high amperages and which is at the same time safe against overcharging through the fact, for example (perhaps according to Belgian Patent 679,267), that the electrolyte has been dried to such an extent that the inside pressure occurring in the case of any length of overcharging of the battery with an amperage freely selectable in adaptation to its construction and the intentions of its use will not surpass a pressure limit which, for practical purposes, has already been set at the time of its production, and which is freely selectable in adaptation to its housing construction and in dependence on the conditions of use for which it is intended;

b. the charging device with main circuit connection has been adjusted to the higher amperage necessary for quick charging, while its circuit elements have been dimensioned in a space-saving manner, said adjustment having been made preferably through a thyristor circuit, well-known in the art; and c. at least one battery has been provided on its housing and/or preferably in its inside with a temperature feeler for the purpose of recording the charging state and, if need be, for automatic termination of the charging process; said temperature feeler can be, for example, a thermodetector, a bimetallic strip, a resistance thermometer, or any similar known temperature measuring device, so that after achieving the desired, and especially the complete, charging state, a contact and/or a signal can be triggered because of the increase in temperature starting at the overcharging, as a result of which the charging circuit can be interrupted, if need be, automatically.

Basically, lead batteries and also silver-cadmium and silver-zinc batteries can be used within the scope of the present invention. Nickel-cadmium batteries have proven themselves to be particularly advantageous because of their long life and simple manufacture.

Even though, according to the present invention, batteries have been used for the electric razor which are safe against overcharging, still provision has been made to complete the charging process soon after the fully charged state has been reached. The batteries are guaranteed to be fully recharged whenever the amount of current that has flowed through the charging circuit amounts to at least 1 C, wherein C designates the charging capacity of the batteries. After this quantity of current has passed through, the charging current can be switched off with the help of a timer-actuated switch which is known in the art, and if need be, automatically. the switching-off can also be accomplished (if need be, automatically) by means of a coulometer. It is possible to accomplish the switching-off of the charging current by means of an auxiliary electrode or by means of a charging current recording, if the battery is to be fully recharged. However, However, it is preferable to use the temperature increase, which will occur in the battery after reaching its full charging state during the further overcharging, for interruption of the charging current. Therefore, a temperature sensor such as a thermodetector, a bimetallic strip, a resistance thermometer, a thermocouple, or similar known temperature measuring device has been provided on the housing of the battery or more preferably within its gastight enclosure so that after reaching an increased temperature such as 60° C. or more the charging current is turned off by temperature-responsive means such as a relay which opens the charging circuit.

A nickel-cadmium battery with 1 ampere hour capacity will increase its temperature to little more than the temperature of its surroundings, for example, during charging with an amperage of 2 amperes, whereas during the overcharging with the same amperage, a temperature of more than 60° C. will occur. Also, a thermoresistance or a temperature-dependent stopper circuit such as those having a germanium rectifier or transistor is suitable, which, in the case of the pertinent temperatures of about 60° to 70° C. caused by overcharging, changes its conductivity.

The increase in temperature which has been utilized in the present invention and which occurs after the charging of the battery has been completed, is conditioned through the thermal effect of the chemical reactions for the formation and consumption of gaseous oxygen and hydrogen. As compared to that, the heat development of the battery prior to reaching the full charging state which, in this phase, is characterized through the regeneration of the active masses, is only small.

The high charging amperages provided within the scope of the present invention for the recharging of the batteries require a charging device for the razor which is particularly adapted for these purposes. The charging devices heretofore used in battery-operated razors, are devised for low currents and they therefore get along with small-dimensioned switching elements. The size of the charging device for the razor according to the invention is determined in the first place by the transformer which converts the main voltage of 110 or 220 volts down to the charging voltage of about 3.5 volts required for the recharging of the batteries, which can be two nickel-cadmium cells connected in series. The lines and the circuit elements of the charging circuit have been dimensioned in such a manner that they will permit a recharging with higher amperages such as one of more than 2 amperes.

It is possible to keep the charging device particularly small in its outside dimensions and particularly low in its weight through the use of a thyristor circuit, which is well known in the art. As a result, the transformer, which has been necessary in the traditional charging devices, has become superfluous. With these assumptions, the charging device can also easily be mounted in a small and handy razor.

A thyristor circuit has not only the advantage that it is particularly space saving, but it is also particularly suitable for use in installations according to the present invention because it can be used for high charging amperages. Additionally, it has the advantage that the entire energy taken from the energy source will be converted approximately in its entirety into stored energy.

Figure 2:
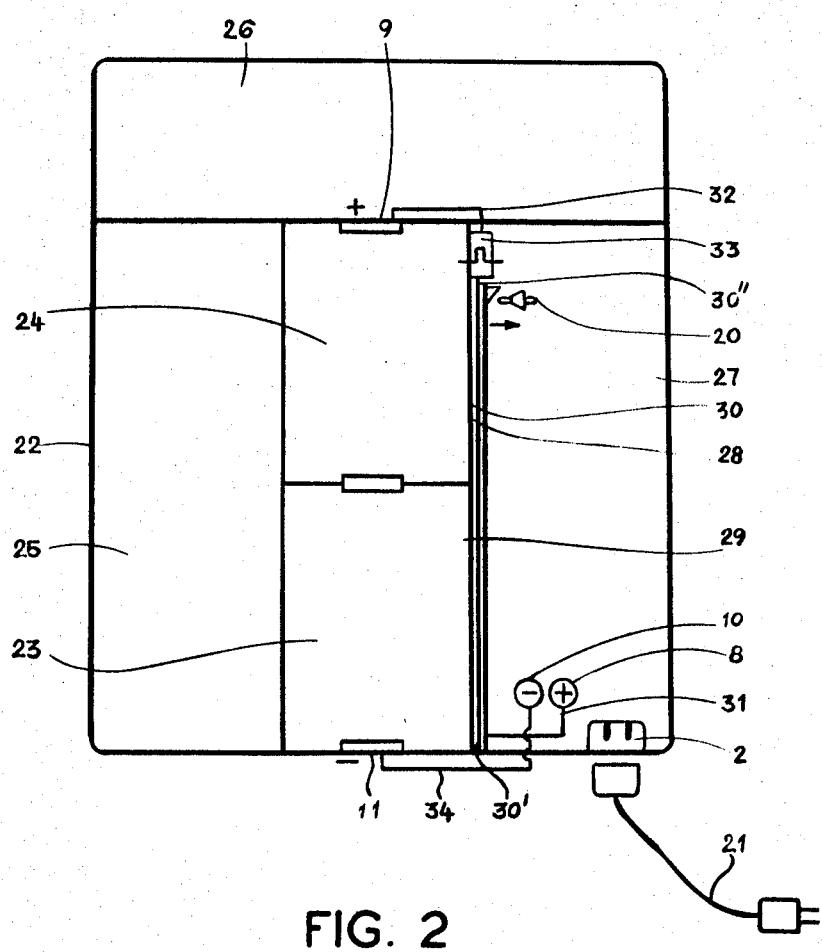

The invention is explained in more detail through the drawings, wherein:

FIG. 1 is a schematic representation of an embodiment of the charging circuit according to the present invention; and FIG. 2 is an electric razor according to the present invention.

Numerals 1 to 20 designate the circuit elements of a main charging device and of a battery. The primary winding 1 of a transformer has been connected to a power outlet 2 of 220 volt AC voltage. The secondary winding 3 of the transformer is connected with a rectifier 4 by a Graetz circuit to which the charging circuit of a battery 5 is connected. A variable resistance 6 is provided for the adjustment of the desired charging amperage, which can be measured with the aid of an ammeter 7. The circuits of the present invention can contain further circuit elements to effect certain results, as is well known in the art. The positive pole 8 of the charging device is connected with the positive connecting terminal 9 of the battery 5; correspondingly, the negative terminal 10 of the charging device is connected with the negative terminal 11 of the battery 5.

The positive electrode 12 of the battery has been separated from its negative electrode 13 by a porous nonconductive separator 14. The soldered junction 15 of a thermoelement (in the present example, iron constantan) has been arranged electrically insulated between the negative electrode 13 and the separator 14. Lead wires 16 and 17 of the thermoelement lead to a relay 18, the relay contact 19 of which opens and closes the charging circuit.

As long as the temperature in the battery remains below a certain responding temperature of 70° C., as stated in this example, the contact 19 will close the charging circuit. As soon as the responding temperature has been surpassed, the thermoelectric voltage will bring about an interruption of the charging circuit through lifting of the contact in the direction of the arrow.

In order to prevent the circuit from being closed unintentionally, a stop input 20 is provided with which the relay contact 19 locks and through which the latter is held firmly even in the case of a decreasing thermoelectric voltage. Through plugging the power supply line 21 into the power outlet 2, the contact is again unlocked automatically in any convenient manner such as by a solenoid in series with the primary winding 1 of the transformer.

FIG. 2 shows an embodiment by way of example of the electric razor according to the present invention. The razor has a housing 22 in which there are two batteries 23 and 24 connected in series which serve for the drive of a low current motor 25 which can operate a shearing system 26. The batteries 23 and 24 can be recharged with a charging device 27 connected to the power supply. On the two housing walls 28 and 29 of the two batteries, a bimetallic strip 30 fits closely, which is a part of the charging circuit. Its fixed end has been connected with the positive pole 8 of the charging device 27 via a wire 31. Its movable end 30'' has been connected with the positive pole 9 of the storage battery 23 and 24 at normal temperature via a wire 32 and a contact 33. The negative pole 10 of the charging device 27 has been connected with the negative pole 11 of the storage batteries 23 and 24 via a wire 34.

When reaching a set temperature, for example, 60° to 70° C., which occurs during the charging process along the housing walls 28 and 29 of the batteries 23 and 24, the movable end 30'' is lifted off the contact 33 in the direction of the arrow and, as a result, interrupts the charging process; simultaneously, the movable end 30'' locks into a receptacle 20 so that the movable end 30'' will not again close the charging circuit at a decreasing temperature. Through plugging the power supply cable 21 into the plug socket 2, the movable end 30'' is automatically unlocked again in any convenient manner.

The disconnections of the charging circuit, which will remain in force until the next intended charging process, represent an essential feature of the present invention.

Although the present invention has been described in considerable detail with reference to certain preferred embodiments, it will be understood that various modifications can be made without departing from the spirit and scope thereof.

What we claim is:

1. In an electric razor system having a shearing means, an electric motor to drive said shearing means, a rechargable gastight battery for supplying electric power to operate the motor, and a charging system for recharging the battery using power derived from a source of alternating voltage, the improvement in the system which allows the battery to be recharged at such a high rate of charging current that the charging current would cause destruction by excess pressure, when fully charged, of any such batteries in gastight enclosures which did not use a partially dried electrolyte to reduce the potential pressure inside the gastight enclosure during overcharging, comprising:

A. an electrical storage cell comprising:
   A1. a gastight, sealed container,
   A2. an amount of electrolyte in the container insufficient in quantity, when the electrolyte decomposes with overcharging of the cell to permit the development within the container of a gas pressure sufficient to break the seal of the container,
   A3. a positive electrode and a negative electrode to which the cell is connected for charging and discharging, and
   A4. a porous, nonconductive separator in the electrolyte between the positive and negative electrodes,
B. charging means for receiving current from said source of alternating voltage and for providing a charging current at said high rate to charge said cell at a reduced voltage,
C. temperature-sensing means responsive to the temperature of the cell for supplying an electrical indication that the temperature in the cell has risen to a predetermined value, thereby indicating the degree of charge of the cell, wherein the temperature-sensing means comprises an electrically insulated thermosensitive element arranged between the negative electrode and the separator to sense the temperature within the sealed container,
D. switch means responsive to said indication to terminate the supply of charging current when said temperature reaches said predetermined value, and
E. retaining means for holding said switch means in an open condition after its operation to terminate the current supply until the retaining means is externally released.

2. A system for controlled charging of the battery of a portable electric razor, comprising:

A. a source of alternating line voltage,
B. a transformer for converting the line voltage to a lower alternating voltage,
C. a full-wave bridge rectifier circuit for receiving said lower alternating voltage and converting it to a full-wave rectified direct voltage,
D. an electric storage cell comprising:
   D1. a gastight, sealed container,
   D2. an amount of electrolyte insufficient in quantity, when the electrolyte decomposes with overcharging of the cell, to permit the development within the container of gas pressure sufficient to break the seal of the container,
   D3. a positive electrode and a negative electrode to which the cell is connected for charging and discharging, and
   D4. a porous, nonconductive separator in the electrolyte between the positive and negative electrodes,
E. means connecting the full-wave rectified direct voltage across the positive and negative electrodes of the cell comprising:
   E1. a switch means operated by a control indication to terminate the supply of the full-wave rectified direct voltage to the electrodes,
   E2. a variable impedance in the current path for varying the amount of current flow to the battery, and
   E3. current measurement means for measuring the amount of current flow through the variable impedance,
F. a temperature-sensing means comprising an electrically insulated thermosensitive element arranged between the negative electrode and the separator to sense the temperature within the sealed container for supplying an electrical indication that the temperature in the cell has risen to a predetermined value, thereby indicating the degree of charge of the cell,
G. switch operating means for applying said electrical indication as the control indication to operate said switch operating means to terminate the supply of full-wave rectified direct current to the cell when said temperature reaches said predetermined value, and H. retaining means for holding the switching means in its open condition after the switch is operated in response to the temperature-sensing means and for holding the switch in the open position independently of the state of the temperature-sensing means.

UNITED STATES PATENT OFFICE
CERTIFICATE OF CORRECTION

Patent No. 3,601,679            Dated August 24, 1971

Inventor(s) Artur Braun

It is certified that error appears in the above-identified patent and that said Letters Patent are hereby corrected as shown below:

Col. 1, line 37, delete "such", insert --Such--

Col. 2, line 63, delete "be low", insert --line-powered--

Col. 2, line 64, delete "below", insert --be low--

Signed and sealed this 25th day of January 1972.

(SEAL)
Attest:

EDWARD M. FLETCHER, JR.        ROBERT GOTTSCHALK
Attesting Officer                Commissioner of Patents